United States Patent [19]
Lasecki

[11] Patent Number: 6,030,227
[45] Date of Patent: Feb. 29, 2000

[54] DIGITAL SOLAR SYSTEM MODEL

[76] Inventor: Walter Lasecki, 13300 Kerrydale Rd., Dale City, Va. 22193-5020

[21] Appl. No.: 09/174,385

[22] Filed: Oct. 16, 1998

[51] Int. Cl.⁷ .................................................... G09B 23/00
[52] U.S. Cl. ........................................... 434/286; 434/284
[58] Field of Search ................................. 434/276, 284, 434/285, 286, 291, 292

[56] References Cited

U.S. PATENT DOCUMENTS

| | | | |
|---|---|---|---|
| 2,475,620 | 7/1949 | Justice | 434/275 |
| 3,005,270 | 10/1961 | Musser | 434/286 |
| 3,266,176 | 8/1966 | Waldrop | 434/285 |
| 3,387,393 | 6/1968 | Musser | 434/284 |
| 3,651,586 | 3/1972 | Funk | 434/284 |
| 4,713,011 | 12/1987 | Alnafissa . | |
| 4,726,773 | 2/1988 | Lazar | 434/285 |
| 4,955,714 | 9/1990 | Stotler et al. | 434/286 |
| 5,324,224 | 6/1994 | Anderson et al. | 434/286 |

*Primary Examiner*—Sam Rimell
*Attorney, Agent, or Firm*—Jack Lo

[57] ABSTRACT

A digital solar system model includes a display with a center representing the sun, and discrete lamps arranged in concentric loops around the sun representing the planetary orbits. The lamps are controlled by a processor. The orbital motion of each planet is represented by sequentially illuminating the lamps in a corresponding orbit. Each planet must wait through a predetermined count between adjacent lamp positions, and the count is proportional to the size of the orbit. Upon startup, the planets are set to their proper relative positions on a default starting date, then set in motion at their proper relative orbital rates. The speed, direction, and starting/stopping of orbital motion are controlled via a motion control keypad. Time passage is shown on a digital date display. Numeric keys are provided on the motion control keypad for entering a GOTO date of a desired Earth year and month within a permitted range of past and future dates. When a GOTO date is entered, the planets are reset to their positions on the default starting date, then set in motion toward the GOTO date, orbiting forward when the GOTO date is in the future, or backward when the GOTO date is in the past. The planets are stopped when the GOTO date is reached.

19 Claims, 5 Drawing Sheets

DIGITAL SOLAR SYSTEM MODEL

BACKGROUND OF THE INVENTION

1. Field Of The Invention

This invention relates generally to solar system models.

2. Prior Art

The nine planets of our solar system orbit the sun at known speeds and orbital relationships to each other. Models of the solar system are well known. U.S. Pat. No. 4,713,011 to Alnafissa shows a mechanical model with planets mounted on concentric, rotatable discs. However, it is mechanically complicated, it does not display all the planets, and its accuracy in modeling orbital relationships is very poor. The workings of the solar system is also simulated by some software. However, computer monitors are generally too small for providing an easy-to-view display. Further, a personal computer is used for many different tasks, so that it cannot be dedicated to displaying the solar system at all times.

OBJECTS OF THE INVENTION

Accordingly, the objects of the present digital solar system model are:

- to display all the planets of the solar system simultaneously;
- to show the relative orbital relationships of the planets with great accuracy;
- to enable the selection of individual planets for display;
- to set the planets in their proper relative positions at a default startup date;
- to provide a running date display showing time passage;
- to provide flexible control of orbital speed and direction;
- to be programmable for making the planets orbit to any date in the past or the future;
- to be easily scalable to any physical size for easy viewing; and
- to be a cost effective, full-time, dedicated solar system model.

Further objects of the present invention will become apparent from a consideration of the drawings and ensuing description.

BRIEF SUMMARY OF THE INVENTION

A digital solar system model includes a display with a center representing the sun, and discrete lamps arranged in concentric circles around the sun representing the planetary orbits. The lamps are controlled by a processor. The orbital motion of each planet is represented by sequentially illuminating the lamps in a corresponding orbit. Each planet must wait a predetermined count between adjacent lamp positions, and the count is proportional to the size of the orbit. Upon startup, the planets are set to their proper relative positions on a default starting date, then set in motion at their proper relative orbital rates. The speed, direction, and starting/stopping of orbital motion are controlled via a motion control keypad. Time passage is shown on a digital date display. Numeric keys are provided on the motion control keypad for entering a GOTO date of a desired Earth year and month within a permitted range of past and future dates. When a GOTO date is entered, the planets are reset to their positions on the default starting date, then set in motion toward the GOTO date, orbiting forward when the GOTO date is in the future, or backward when the GOTO date is in the past. The planets are stopped when the GOTO date is reached.

DRAWING REFERENCE NUMERALS

| | | | |
|---|---|---|---|
| 1–9. | Planetary Orbits | 10. | Display |
| 11. | Motion Control Keypad | 12. | Planet Selection Keypad |
| 13. | Date Display | 14. | Processor |
| 15. | Numeric Keypad | 16. | "FASTER" Key |
| 17. | "SLOWER" Key | 18. | "REV/FWD" Key |
| 19. | "STOP/RUN" Key | 20. | "BC/AD" Key |
| 21. | "ENTER" Key | 22. | Motion Status Indicators |
| 23–31. | Planet Selection Keys | 32. | Planet Selection Indicators |
| 33. | Reset | 34. | Opaque Sheet |
| 35. | Lamps | 36. | Translucent Ring |
| 40–80. | Flowchart Blocks | S. | Sun |

DETAILED DESCRIPTION OF THE INVENTION

Figure 1:
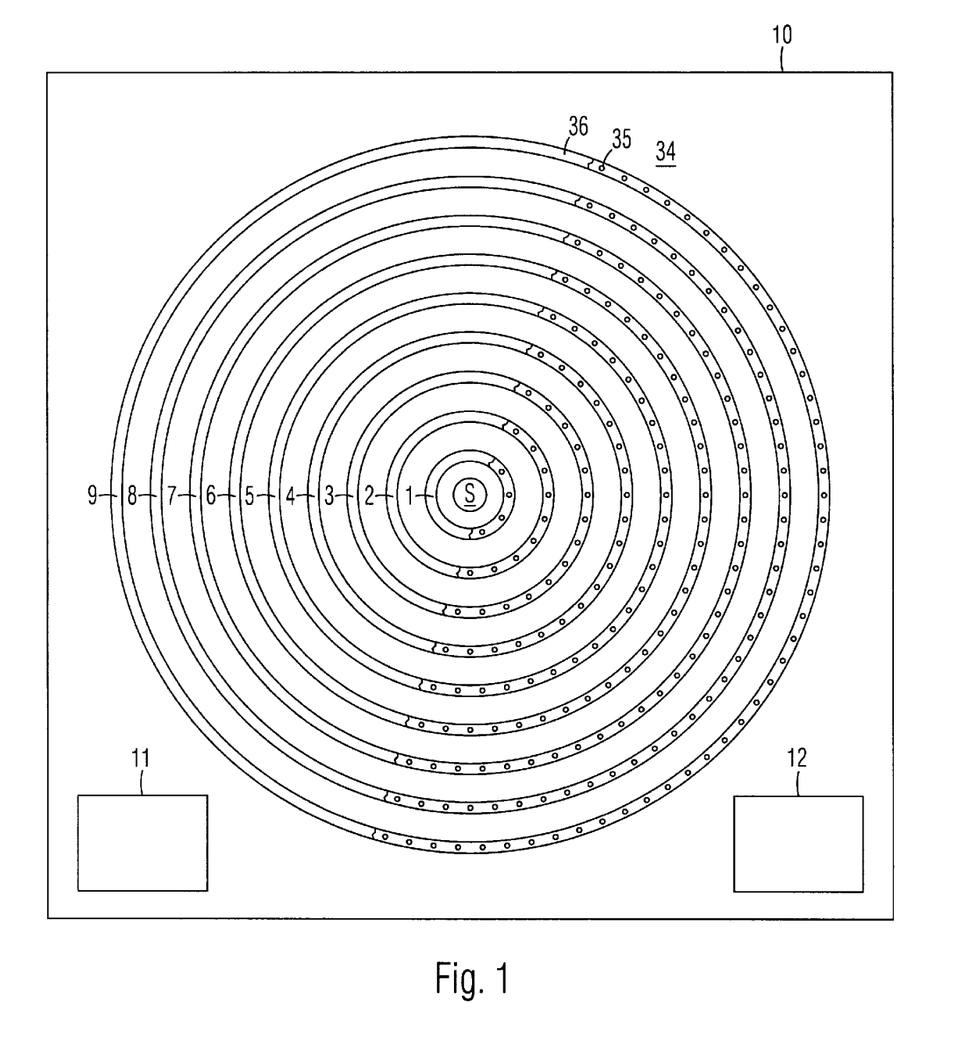
FIG. 1 is a front view of the present digital solar system model.

FIG. 1:

A preferred embodiment of the digital solar system model is shown in the front view in FIG. 1. It includes an orbits display 10 with the sun S at the center, and orbits 1–9 representing the orbits of the nine planets in our solar system. Orbits 1–9 are each comprised of discrete lamps 35 arranged in a continuous loop. Lamps 35 are preferably LED's, but any other type of electrically activated light emitting device may be used. Lamps 35 in each orbit are preferably covered by a translucent ring 36 of a color corresponding to the color of the lamps underneath. The background of display 10, including the areas between orbits 1–9, is preferably comprised of an opaque satin black sheet 34. Display 10 also includes a motion control keypad 11, and a planet selection keypad 12.

The orbital rate of a reference planet is used to determine the relative orbital rates of the other planets. The reference planet is preferably Earth. In the following table, the orbital rates of the planets in Earth years are shown, i.e., the number of Earth years required for each planet to orbit the sun once. The preferred lamp color, orbit diameter, number of lamps in each orbit, and angular spacing between lamps in each orbit are also shown. In this example, the orbit diameters and number of lamps in each orbit result in the spacing of all lamps in all orbits being an identical 0.942".

| Orbit | Planet | Orbit Color | Orbit Dia. | No. of Lamps | Angular Spacing | Orbital Rate (Earth years) |
|---|---|---|---|---|---|---|
| 1 | Mercury | Green | 3" | 10 | 36.0° | .24084203955582 |
| 2 | Venus | Orange | 6" | 20 | 18.0° | .61518770396653 |
| 3 | Earth | Blue | 9" | 30 | 12.0° | 1.00000000000000 |
| 4 | Mars | Red | 12" | 40 | 9.0° | 1.88081783735243 |
| 5 | Jupiter | Yellow | 15" | 50 | 7.2° | 11.8617873491469 |
| 6 | Saturn | Green | 18" | 60 | 6.0° | 29.4566550583700 |
| 7 | Uranus | Orange | 21" | 70 | 5.1429° | 84.0106664914471 |
| 8 | Neptune | Blue | 24" | 80 | 4.5° | 164.785794073198 |

-continued

| Orbit | Planet | Orbit Color | Orbit Dia. | No. of Lamps | Angular Spacing | Orbital Rate (Earth years) |
|---|---|---|---|---|---|---|
| 9 | Pluto | Red | 27" | 90 | 4.0° | 247.675602864840 |

Figure 2:
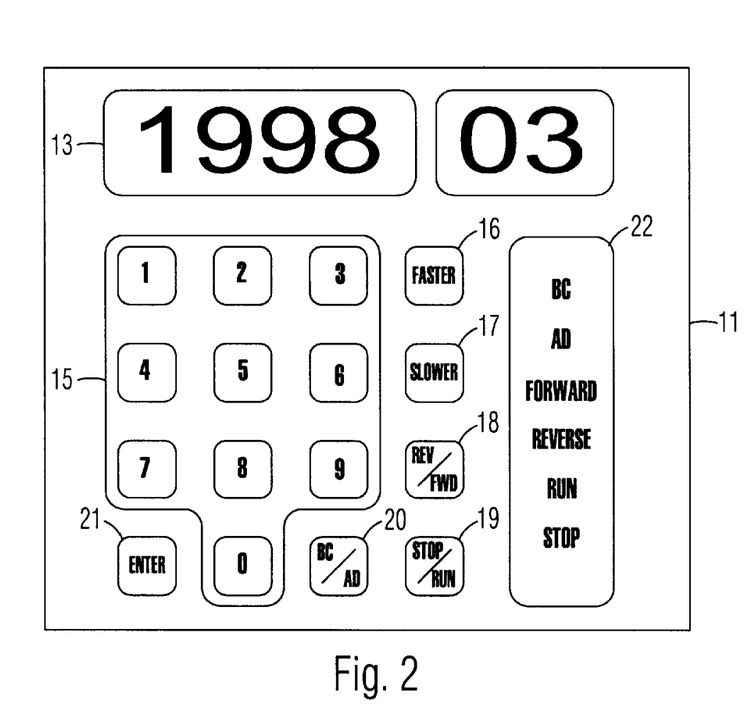
FIG. 2 is a motion control keypad of the model.

FIG. 2:

Motion control keypad 11 is shown in FIG. 2. It includes a date display 13 that preferably shows a four digit year followed by a two digit month, a numeric keypad 15 for entering a GOTO date, a "FASTER" key 16 for increasing orbital speed, a "SLOWER" key 17 for reducing orbital speed, a "REV/FWD" toggle key 18for changing orbital direction, a "STOP/RUN" key 19 for starting and stopping orbital motion, a "BC/AD" toggle key 20 for selecting the era before or after Christ, an "ENTER" key 21 for entering the selected GOTO date, and a group of illuminated motion status indicators 22 for indicating the selected modes. When a GOTO date is entered, the planets orbit to it from a default starting date, preferably January 2000.

Figure 3:
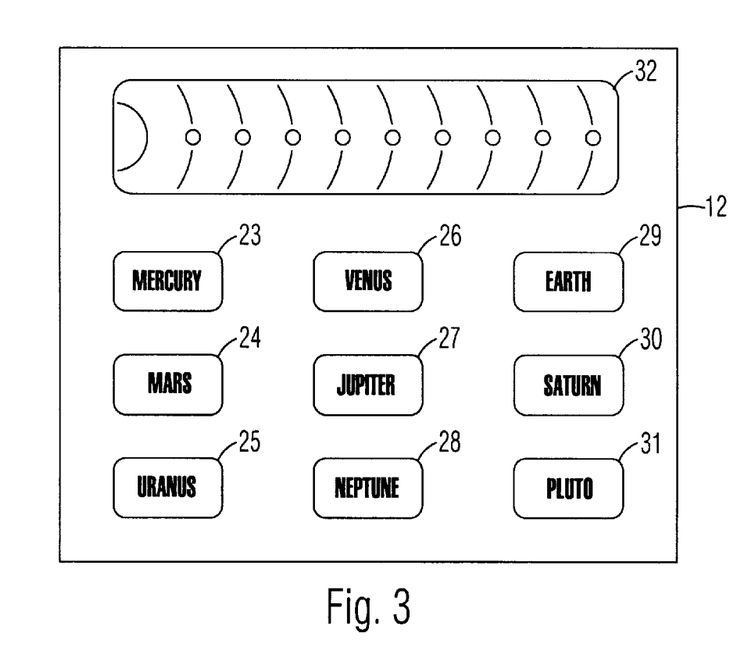
FIG. 3 is a planet selection keypad of the model.

FIG. 3:

Planet selection keypad 12 is shown in FIG. 3. It includes selection keys 23–31 labeled with the names of the nine planets for selecting the planets for which to display motion, and a group of illuminated planet selection indicators 32 for indicating which planets are selected. The selected planets are illuminated in indicators 32, preferably in colors corresponding to the orbit lamp colors. The orbits of the non-selected planets are not illuminated on display 10 (FIG. 1), but the positions of the non-selected planets are still updated, so that whenever these planets are selected, they will be shown in their proper positions.

Figure 4:
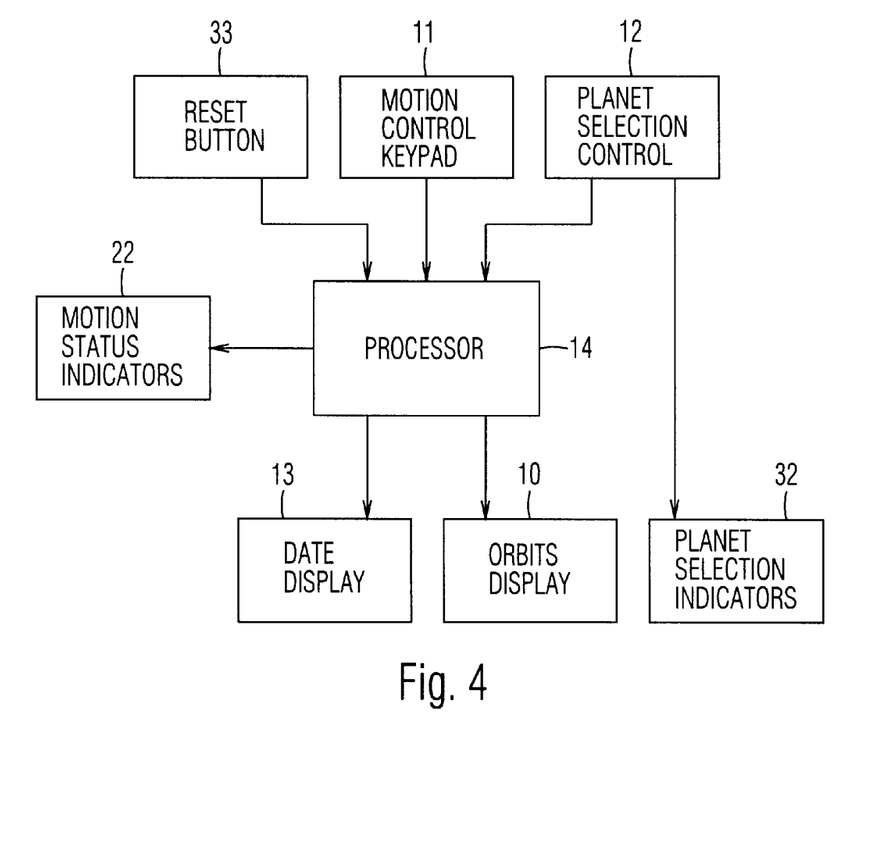
FIG. 4 is an electrical block diagram of the model.

FIG. 4:

An electrical block diagram of the solar system model is shown in FIG. 4. Motion control keypad 11 provides input to a processor 14, which controls the display of information on motion status indicators 22, orbits display 10, and date display 13. Planet selection keypad 12 is connected to processor 14 for controlling the illumination of individual orbits, and is also connected to planet selection indicators 32 for indicating the planets which are currently illuminated. A reset button 33 is connected to processor 14 for resetting the system, which has the same effect as powering off and then powering on the system again.

Regardless of the orbit, all lamps are preferably separated by the same distance for convenience in control, and consistency in orbital motion smoothness between orbits. However, orbital speed is inversely proportional to orbit diameter. Therefore, the farther a planet is from the sun, the longer it would take to traverse from one lamp position to the next. Each planet must therefore wait through a count of a predetermined number before being advanced from one position to the next, i.e., count between lamp positions. The farther a planet is from the sun, the higher its count between lamp positions.

In this example, the Earth's orbit is represented by 30 lamps. The total count for the orbit is the count between lamp positions multiplied by the number of lamps. Given the number of lamps in other orbits and reasonable processing resources, the total count for the Earth's orbit that provides the best overall positional accuracy for all the planets is 249,000, so that the corresponding count between lamp positions is 8,300. Using the Earth as a reference, the count between lamp positions for the orbits of other planets are calculated as follows:

$$\left(\frac{\text{total count for orbit of Earth}}{\text{no. of lamps in orbit of desired planet}}\right) \times \text{orbital rate of desired planet}$$

If the resulting count between lamp positions is not a whole number, it must be rounded. The error introduced during rounding in the orbital rate of the desired planet can be calculated as follows:

$$\text{actual orbital rate} - \left(\frac{\text{rounded count} \times \text{number of lamps}}{\text{total count for orbit of Earth}}\right)$$

As an example, the count between lamp positions for Saturn is calculated as follows:

$$\left(\frac{249,000}{60}\right) \times 29.45665505837 = 122245.118492236$$

The result is rounded to 122,245. The error in the orbital rate is calculated as follows:

$$29.45665505837 - \left(\frac{122,245 \times 60}{249,000}\right) = .0000285523459$$

Over 10,000 Earth years, this orbital rate error results in an error of 0.02 lamp position, but there is no visible effect in lamp position. In this example for Saturn, this error represents an accuracy of 99.998% after 10,000 Earth years. Calculated using the same general formulas above, the rounded counts between lamp positions and errors in orbital rates for all the planets are as follows:

| Planet | Count Between Lamp Positions | Error in Orbital Rate |
|---|---|---|
| Mercury | 5,997 | .0000013339 |
| Venus | 7,659 | .0000069810 |
| Earth | 8,300 | .0000000000 |
| Mars | 11,708 | .0000146245 |
| Jupiter | 59,072 | .0000600404 |
| Saturn | 122,245 | .0000285523 |
| Uranus | 298,838 | .0000162394 |
| Neptune | 512,896 | .0000693806 |
| Pluto | 685,236 | .0000597857 |

The rounded counts between lamps positions for all the planets are stored in the processor's memory.

Figure 5A:
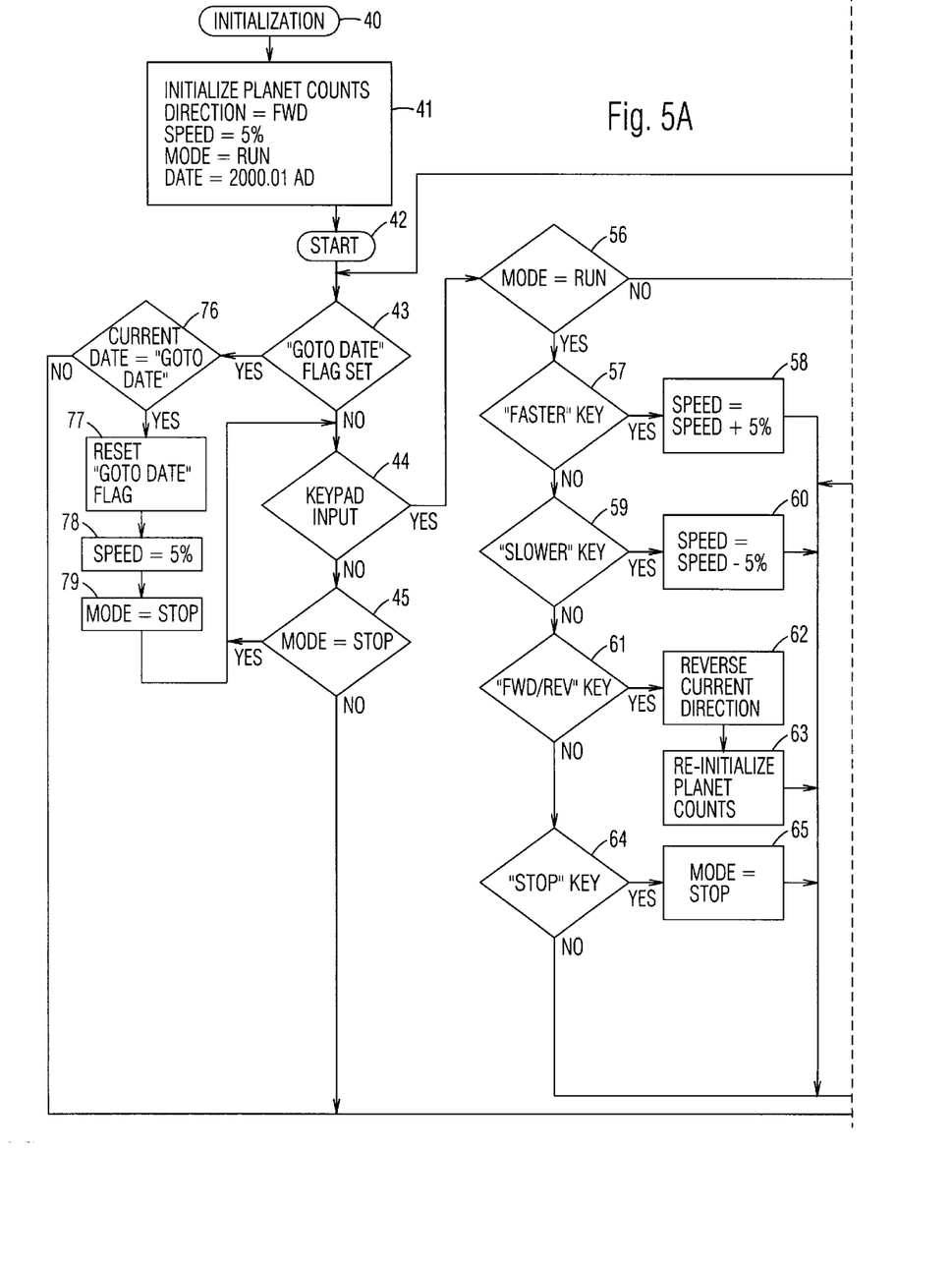
FIG. 5A is a first partial view of a flowchart of the control software of the model.
Figure 5B:
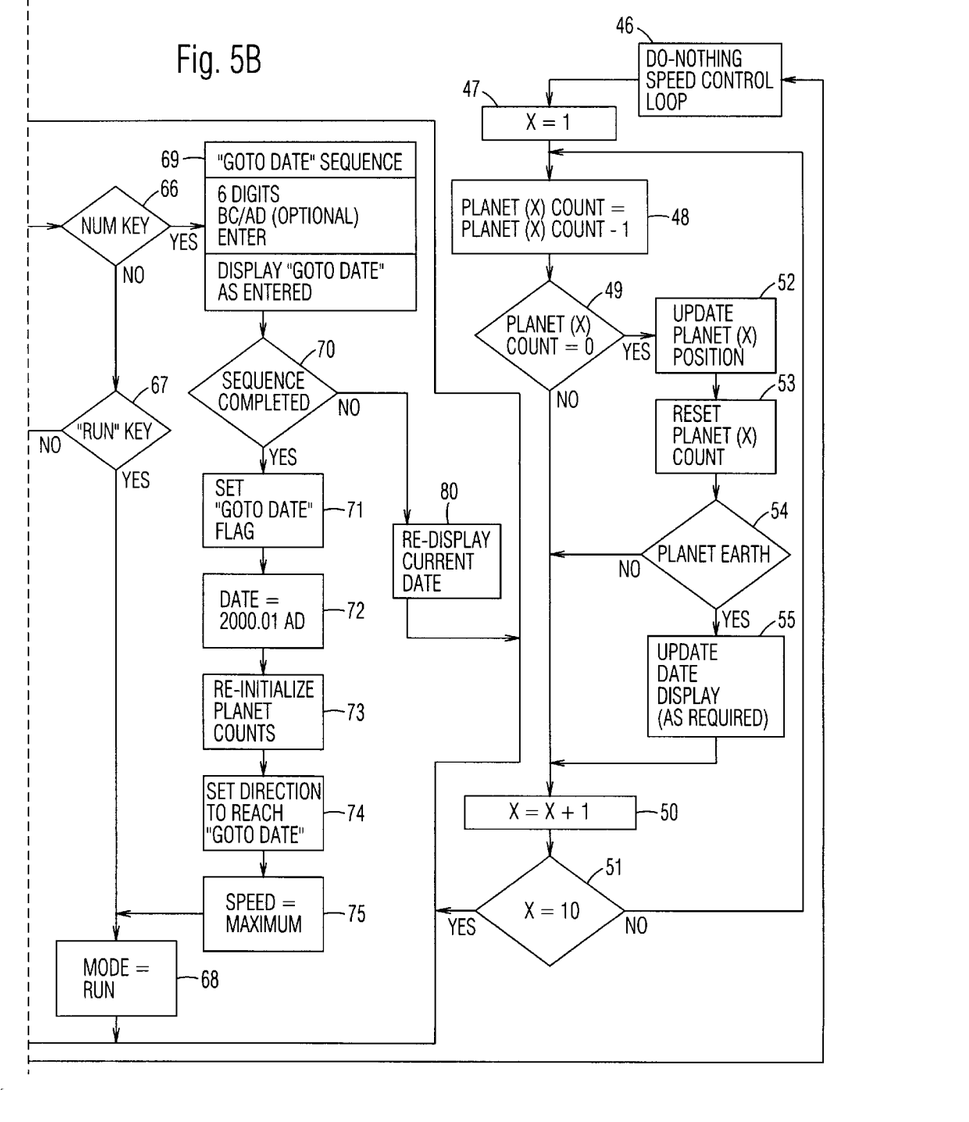
FIG. 5B is a second partial view of the flowchart.

FIGS. 5A–5B:

A flowchart of the control software for the processor is shown in FIG. 5A and 5B. Initialization occurs at block 40 when the system is powered up. At block 41, all the default conditions are set: the counts between lamp positions are reset for all the planets, the orbital direction is set to forward, the orbital speed is set to 5%, the mode is set to run, the displayed date is set to January 2000 AD, and the planets are set to their proper positions on that default date. The orbital speed is adjusted by changing the length of a do-nothing loop in the control software: the longer the loop, the slower the orbital speed, and vice versa. A 100% orbital speed may be achieved by reducing the do-nothing loop to zero. As seen from the north pole of the Earth, the forward orbital direction is counterclockwise.

After start at block 42, if no GOTO date has been set or if it is set incorrectly at block 43, there is no keypad input at block 44, and the mode is not STOP at block 45, the orbits are operated at the default setting. Specifically, the currently selected speed setting or do-nothing speed control loop is used at block 46, and X, which represents the planet, is set to 1 or Mercury at block 47. The count between lamp positions for planet 1, i.e., Mercury, is decreased by 1 at block 48 from 5,997 to 5,996, and the reduced count value is stored as a temporary count value. If the count for planet (X) is not 0 at block 49, X is set to X+1 at block 50, i.e., to the next planet, which is Venus. If X is not 10 at block 51, i.e., not all the planets have been cycled through, the process is returned to block 48, where the count between lamp positions for Venus is decreased by 1 from 7,659 to 7,658, and the reduced count value is stored as a temporary count value. Blocks 48–51 are looped until X=10, i.e., all the planets have been cycled through. At this point, the counts for the planets have each been reduced by one.

The process is returned to block 43. If no GOTO date is set at block 43, there is no keypad input at block 44, and the mode is not STOP at block 45, the process is continued at block 47, where X is again set to 1, i.e., Mercury. The previously stored temporary count value for Mercury, i.e., 5,996, is reduced by 1 to 5,995, and stored as the current temporary count value. If the count for planet (X), i.e., Mercury, is not 0 at block 49, the next planet is selected at block 50. Therefore, the count for a planet is reduced by 1, the next planet is selected, and its count is reduced by 1. This process is continued until the count for a planet has reached 0 at block 49, when the planet's lamp position is advanced by 1 at block 52, and its count is reset to the default value at block 53. If the planet is Earth at block 54, the date display is updated as necessary in one month increments at block 55. As the process is continued, and the lamps in the orbits are advanced sequentially, the planets would appear to orbit the sun, and a running date showing time passage is shown on the date display.

If the GOTO date is not set at block 43, there is keypad input at block 44, and the mode is RUN at block 56, the other operating modes can be selected. If the FASTER key is pressed at block 57, the orbital speed is increased by a predetermined amount, e.g., 5%, at block 58, and the process is returned to block 43. If the SLOWER key is pressed at block 59, the orbital speed is decreased by preferably 5%, and the process is returned to block 43. If the FWD/REV key is pressed at block 61, the current orbital direction is reversed, and the counts between lamp positions for all the planets are reset to their default values at block 63, and the process is returned to block 43. If the STOP key is pressed at block 64, the mode is set to STOP, the planets are frozen in their current positions in orbit, and the process is returned to block 43.

If the system is not in RUN mode at block 56, the numeric keys are not pressed at block 66, and the RUN key is not pressed at block 67, the process is returned to block 43. If the RUN key is pressed at block 67, the mode is set to RUN at block 68, the orbital motions are resumed, and the process is returned to block 43.

If the system is not in RUN mode at block 56, and the numeric keys are pressed at block 66, a GOTO date is recognized as being entered at block 69. The GOTO date can be up to 6 digits, including the month, and BC or AD can be set, so the permissible range is 9999 (year) 01 (month) BC to 9999 (year) 12 (month) AD. The GOTO date is shown on the date display as entered. If the date entry sequence is not completed or canceled at block 70, the current date is redisplayed at block 80, and the process is returned to block 43. When the date entry sequence is completed, the GOTO DATE flag is set at block 71, the displayed date is set to 2000 (year) 01 (month) AD at block 72, the counts between lamp positions for the planets are reset to their default values at block 73, the direction to reach the GOTO date is set at block 74 (forward if the GOTO date is in the future or backward if the GOTO date in the past), the speed is set to maximum at block 75, and the mode is set to run at block 68. The planets will thus be shown orbiting at full speed from their positions on January 2000 AD to the GOTO date. The process is returned to block 43.

Since at block 43 the GOTO DATE flag is set, the system waits for the GOTO date to be reached at block 76. Before the GOTO date is reached, the process is looped back to block 43. When the GOTO date is reached at block 76, the GOTO DATE flag is reset at block 77, the orbital speed is set to the default, e.g., 5%, at block 78, and the mode is set to STOP at block 79. The planets are thus stopped at their positions on the GOTO date. The previously set speed and direction are resumed when the RUN key is pressed at block 67.

SUMMARY AND SCOPE

Accordingly, a digital solar system model is provided. It displays all the planets of the solar system simultaneously. It shows the relative orbital relationships of the planets with great accuracy. It enables the selection of individual planets for display. It sets the planets to their proper relative positions at a default startup date. It provides a running date display showing time passage. It provides flexible control of orbital speed and direction. It is programmable for making the planets orbit to any date in the past or the future within a permissible range. It is easily scalable to any physical size for easy viewing, It is a cost effective, full-time, dedicated solar system model.

Although the above description is specific, it should not be considered as a limitation on the scope of the invention, but only as an example of the preferred embodiment. Many substitutes and variations are possible within the teachings of the invention. For example, other types of lamps or individually controllable visual indicators can be used. The orbit diameters can be arranged at proper relative scale, and can be elliptical. The number of lamps and the spacing between lamps in each orbit can be changed. The display and orbits can be made in any size. The number of planets can be changed for reducing cost or representing other solar systems. The orbital rates may be changed for improving accuracy or reducing cost. The controller may be comprised of discrete electronics. The counts between lamp positions can be changed. The default values can be changed, including the starting date and speed. The starting date can also be selectively entered if desired. When the GOTO date is in the past, the planets can be set to their positions on the GOTO date, and made to orbit forward. The planets can also be shown at their positions on the GOTO date instantly, without showing the passage of time. More digits can be provided in the date display for a greater range of possible dates. The motion control keypad and planet selection keypad may include other keys for controlling other functions. Therefore, the scope of the invention should be determined by the appended claims and their legal equivalents, not by the examples given.

I claim:

1. A solar system model for displaying orbital motion of a plurality of planets, comprising:

a controller;

a plurality of generally concentric orbits each comprising a plurality of discrete lamps connected to said controller and arranged in a continuous loop, said lamps in each of said orbits being sequentially illuminated by said controller for representing orbital motion of a corresponding planet; and a black background, and a plurality of concentric translucent rings arranged on said black at background, said rings having front and rear sides, said lamps being arranged behind said rings.

2. A solar system model for displaying orbital motion of a plurality of planets, comprising:

a controller;

a plurality of generally concentric orbits each comprising a plurality of discrete lamps connected to said controller and arranged in a continuous loop, said lamps in each of said orbits being sequentially illuminated by said controller for representing orbital motion of a corresponding planet; and numeric keys connected to said controller for entering a date, said controller illuminating corresponding lamps in said orbits for representing proper relative orbital positions of said planets on said date.

3. A solar system model for displaying orbital motion of a plurality of planets, comprising:

a controller;

a plurality of generally concentric orbits each comprising a plurality of discrete lamps connected to said controller and arranged in a continuous loop said lamps in each of said orbits being sequentially illuminated by said controller for representing orbital motion of a corresponding planet; and numeric keys connected to said controller for entering a first date, said controller sequentially illuminating said lamps in said orbits for representing said orbital motion of said planets between said first date and a second date.

4. A solar system model for displaying orbital motion of a plurality of planets, comprising:

a controller;

a plurality of generally concentric orbits each comprising a plurality of discrete lamps connected to said controller and arranged in a continuous loop, said lamps in each of said orbits being sequentially illuminated by said controller for representing orbital motion of a corresponding planet; and a speed control key connected to said controller for controlling orbital motion speed.

5. A solar system model for displaying orbital motion of a plurality of planets, comprising:

a controller;

a plurality of generally concentric orbits each comprising a plurality of discrete lamps connected to said controller and arranged in a continuous loop, said lamps in each of said orbits being sequentially illuminated by said controller for representing orbital motion of a corresponding planet; and a planet selection keypad connected to said controller for selecting said orbits of desired planets for which to display orbital motion.

6. A solar system model for displaying orbital motion of a plurality of planets, comprising:

a controller;

a plurality of generally concentric orbits each comprising a plurality of discrete lamps connected to said controller and arranged in a continuous loop, said lamps in each of said orbits being sequentially illuminated by said controller for representing orbital motion of a corresponding planet; and a digital display connected to said controller for showing time passage corresponding to said orbital motion of said planets.

7. A solar system model for displaying orbital motion of a plurality of planets, comprising:

a plurality of generally concentric orbits each comprising a plurality of discrete lamps arranged in a continuous loop, a total number of said lamps in each of said orbits generally increasing from an innermost orbit to an outermost orbit; and a controller connected to said lamps, said controller sequentially illuminating said lamps in each of said orbits for representing said orbital motion of said planets, said controller advancing an illuminated lamp position to an adjacent lamp after waiting a predetermined count between lamp positions which is different for each of said orbits and generally increasing from said innermost orbit to said outermost orbit, so that said planets are shown to orbit at decreasing angular velocity from said innermost orbit to said outermost orbit.

8. The solar system model of claim 7, further including a black background, and a plurality of concentric translucent rings arranged on said black background, said rings having front and rear sides, said lamps being arranged behind said rings.

9. The solar system model of claim 7, further including numeric keys connected to said controller for entering a date, said controller illuminating corresponding lamps in said orbits for representing proper relative orbital positions of said planets on said date.

10. The solar system model of claim 7, further including numeric keys connected to said controller for entering a first date, said controller sequentially illuminating said lamps in said orbits for representing said orbital motion of said planets between said first date and a second date, said controller illuminating corresponding lamps in said orbits for representing proper relative orbital positions of corresponding planets on said first date and said second date.

11. The solar system model of claim 7, further including a speed control key connected to said controller for controlling orbital motion speed.

12. The solar system model of claim 7, further including a planet selection keypad connected to said controller for selecting said orbits of desired planets for which to display orbital motion.

13. The solar system model of claim 7, further including a digital display connected to said controller for showing time passage corresponding to said orbital motion of said planets.

14. A method for displaying orbital motion of planets in a solar system on a display device with a plurality of generally concentric orbits for said planets, each of said orbits including a plurality of discrete lamps arranged in a continuous loop, said display device including a control keypad, said method comprising:

sequentially illuminating said lamps in each of said orbits for representing said orbital motion of a corresponding planet, an illuminated lamp position being advanced to an adjacent lamp after waiting a predetermined count between lamp positions specific to each of said orbits, said count between lamp positions being determined by:

determining an orbital rate for each of said planets relative to a reference planet;

determining a total count for all lamp positions for a reference orbit of said reference planet; and determining said count between lamp positions for each of said orbits by a formula comprising: (said total count for all lamp positions for said reference orbit÷a total number of lamps in a desired one of said orbits)×said orbital rate of said planet in said desired one of said orbits.

15. The method of claim 14, further including entering a date with said keypad, and illuminating corresponding lamps in said orbits representing proper relative orbital positions of said planets on said date.

16. The method of claim 14, further including entering a first date with said keypad, sequentially illuminating said lamps in said orbits for representing said orbital motion of said planets between said first date and a second date, and illuminating corresponding lamps in said orbits for representing proper relative orbital positions of said planets on said first date and said second date.

17. The method of claim 14, further including varying orbital speeds of said planets in response to speed control inputs on said control keypad.

18. The method of claim 14, further including varying an orbital direction of said planets in response to orbital direction control inputs on said control keypad.

19. The method of claim 14, further including illuminating corresponding lamps in said orbits for representing proper relative positions of said planets on a default starting date upon initialization of said display device, entering an ending date on said control keypad, and sequentially illuminating said lamps in said orbits for representing said orbital motion of said planets from said default starting date to said ending date.

* * * * *